United States Patent
Tan et al.

(10) Patent No.: US 10,880,369 B2
(45) Date of Patent: Dec. 29, 2020

(54) SESSION PERSISTENCE METHOD, DEVICE, AND STORAGE MEDIUM

(71) Applicant: HUAWEI TECHNOLOGIES CO., LTD., Guangdong (CN)

(72) Inventors: Shiyong Tan, Beijing (CN); Xiaoqiang Qiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 16/294,569

(22) Filed: Mar. 6, 2019

(65) Prior Publication Data
US 2019/0208008 A1    Jul. 4, 2019

Related U.S. Application Data

(63) Continuation of application No. PCT/CN2016/099379, filed on Sep. 19, 2016.

(51) Int. Cl.
*H04L 29/08* (2006.01)
*H04L 12/803* (2013.01)
(Continued)

(52) U.S. Cl.
CPC .......... *H04L 67/1027* (2013.01); *H04L 29/08* (2013.01); *H04L 47/125* (2013.01);
(Continued)

(58) Field of Classification Search
CPC ... H04L 29/08; H04L 47/125; H04L 67/1002; H04L 67/1027; H04L 67/1036; H04W 80/10; H04W 8/08
See application file for complete search history.

(56) References Cited

U.S. PATENT DOCUMENTS

| 2003/0172164 A1 | 9/2003 | Coughlin |
| 2014/0006578 A1* | 1/2014 | Kohn ............... H04L 67/1027 |
| | | 709/223 |

(Continued)

FOREIGN PATENT DOCUMENTS

| CN | 102307136 A | 1/2012 |
| CN | 102447638 A | 5/2012 |

(Continued)

OTHER PUBLICATIONS

International Search Report dated Jun. 16, 2017 in corresponding International Application No. PCT/CN2016/099379.
(Continued)

*Primary Examiner* — Jason D Recek
(74) *Attorney, Agent, or Firm* — Leydig, Voit & Mayer, Ltd.

(57) ABSTRACT

Embodiments of the present disclosure provide a universal session persistence method for different communications protocol layers. The method includes: generating, by a first node device, a first interaction message, where the first interaction message includes a first load balancing protocol header, the first load balancing protocol header is independent of a protocol header corresponding to a communications protocol layer at which the first interaction message is generated, the first load balancing protocol header includes a first destination end load balancing index, and the first destination end load balancing index is used to identify a second node device that is to receive the first interaction message; and sending, by the first node device, the first interaction message to the second node device via a first load balancer.

17 Claims, 14 Drawing Sheets

(51) Int. Cl.
*H04W 76/12* (2018.01)
*H04W 8/08* (2009.01)
*H04W 80/10* (2009.01)

(52) U.S. Cl.
CPC ...... *H04L 67/1002* (2013.01); *H04L 67/1036* (2013.01); *H04W 8/08* (2013.01); *H04W 76/12* (2018.02); *H04W 80/10* (2013.01)

(56) References Cited

U.S. PATENT DOCUMENTS

| 2015/0043583 | A1 | 2/2015 | Liu |
| 2015/0067027 | A1* | 3/2015 | Liu .................... H04L 65/1069 709/203 |
| 2015/0319074 | A1 | 11/2015 | Ruan et al. |

FOREIGN PATENT DOCUMENTS

| CN | 103314615 A | 9/2013 |
| CN | 103460675 A | 12/2013 |
| WO | 2014177190 A1 | 11/2014 |

OTHER PUBLICATIONS

International Search Report, dated Jun. 16, 2017, in International Application No. PCT/CN2016/099379 (4 pp.).

* cited by examiner

SESSION PERSISTENCE METHOD, DEVICE, AND STORAGE MEDIUM

CROSS-REFERENCE TO RELATED APPLICATIONS

This application is a continuation of International Application No. PCT/CN2016/099379, filed on Sep. 19, 2016, the disclosure of which is hereby incorporated by reference in its entirety.

TECHNICAL FIELD

The present disclosure relates to the field of communications technologies, and in particular, to a session persistence method, a device, and a storage medium.

BACKGROUND

A load balancing technology is a key part of a cluster system. A load balancer is usually deployed at a front end of the cluster system, and is configured to distribute a terminal request in a server cluster system according to a configured load balancing policy. Generally, request messages related to a same terminal usually need to be persistently distributed to and completed on a same node device in the server cluster system. This mechanism is referred to as a session persistence mechanism. The load balancer usually implements session persistence by using a load balancing index used to identify a node device that is to receive an interaction message.

In a process of interaction between a terminal and the server cluster system, the load balancer needs to be confronted with a plurality of upper-layer communications protocols and a plurality of lower-layer communications protocols. For example, FIG. 1 shows an example in which the load balancing technology is applied to a mobile core network. Functions of a mobility management entity (MME) and functions of a gateway (GW) are distributed on a plurality of virtual machines (VM), and interaction with another external network element is implemented by using the load balancer. An evolved NodeB (eNB) interacts with the MME by using the S1 Application Protocol (S1AP) as an application layer protocol, and the Stream Control Transmission Protocol (SCTP) is used as a transport layer protocol of the evolved NodeB. A home subscriber server (HSS) interacts with the MME by using the Diameter protocol as an application layer protocol, and the Stream Control Transmission Protocol or the Transmission Control Protocol (TCP) is used as a transport layer protocol of the home subscriber server. The general packet radio service (GPRS) tunneling protocol, GTP) is used as an application layer protocol for interaction between the MME and the GW, and the User Datagram Protocol (UDP) is used as a transport layer protocol.

Locations and specific forms of the load balancing index in a protocol stack vary with different communications protocols used. Therefore, during session persistence, the load balancer needs to separately use different processing mechanisms to obtain the load balancing index, and send the interaction message to the node device that is corresponding to the load balancing index and that is to receive the interaction message, to perform session persistence. For example, when the load balancing index is specifically an IP address in a protocol header corresponding to the Internet protocol (IP), the load balancer needs to parse and obtain the IP address in the IP protocol header as the load balancing index after receiving a request message, to perform session persistence. For another example, when the load balancing index is specifically a Media Access Control (MAC) address at a data link layer, the load balancer needs to parse and obtain the MAC address of a protocol header corresponding to the MAC protocol as the load balancing index after receiving a request message, to perform session persistence.

The load balancer usually needs to use different processing mechanisms to perform session persistence. Consequently, a session persistence implementation mechanism is relatively complex, design of the load balancer is relatively complex, and processing efficiency is relatively low.

SUMMARY

Embodiments of the present disclosure provide a session persistence method, a device, and a storage medium, to provide a universal session persistence mechanism for different communications protocol layers.

According to a first aspect, an embodiment of the present disclosure provides a session persistence method, including: first, generating, by a first node device, a first interaction message, where the first interaction message includes a first load balancing protocol header, the first load balancing protocol header is independent of a protocol header corresponding to a communications protocol layer at which the first interaction message is generated, the first load balancing protocol header includes a first destination end load balancing index, and the first destination end load balancing index is used to identify a second node device that is to receive the first interaction message; and then, sending, by the first node device, the first interaction message to the second node device via a first load balancer.

In this way, when the first node device sends the first interaction message to the second node device via the first load balancer, if different communications protocol layers are used between the first node device and the second node device that exchange a message, the load balancer may use a universal session persistence mechanism, to parse the first load balancing protocol header that is independently set in the first interaction message from the first node device, obtain the first destination end load balancing index in the first load balancing protocol header, and send the first interaction message to the second node device corresponding to the first destination end load balancing index, so as to keep a session on the second node device corresponding to the first destination end load balancing index, without a need to use different session persistence mechanisms for different communications protocol layers.

In a possible implementation, before the first aspect, the method further includes: receiving, by the first node device, a second interaction message from the first load balancer, where the second interaction message includes a second load balancing protocol header, the second load balancing protocol header includes a second destination end load balancing index and a second source end load balancing index, and the first node device corresponds to the second destination end load balancing index; and the generating, by the first node device, a first interaction message includes: generating, by the first node device, the first interaction message based on the second source end load balancing index, where the second source end load balancing index is the same as the first destination end load balancing index; and then, processing, by the first node device, a service based on the second interaction message. In this way, the first node device may generate the first interaction message based on the second source end load balancing index in the second interaction message, and use the second source end load balancing index as the first destination end load balancing index in the first interaction message, to perform session persistence.

In a possible implementation, the second load balancing protocol header further includes a second source end session index, and the generating, by a first node device, a first interaction message includes: generating, by the first node device, the first interaction message based on the second source end load balancing index and the second source end session index, where the first load balancing protocol header further includes a first destination end session index, and the second source end session index is the same as the first destination end session index. In this way, the first load balancing protocol header includes the first destination end load balancing index and the first destination end session index. The first node device may generate the first interaction message based on the second source end load balancing index in the second interaction message and the second source end session index, use the second source end load balancing index as the first destination end load balancing index in the first interaction message, and use the second source end session index as the first destination end session index in the first interaction message, to perform session persistence.

In a possible implementation, the first load balancing protocol header includes the first destination end load balancing index and a first source end load balancing index, and the first source end load balancing index is used to identify the first node device. In this way, after the first node device sends the first interaction message to the second node device at a peer end, the second node device may learn a node device that exchanges a message with the second node device, and the second node device may use the first source end load balancing index as a destination end load balancing index in a subsequent interaction message when subsequently generating the interaction message with the first node device, to perform session persistence.

In a possible implementation, the first load balancing protocol header includes the first destination end load balancing index, the first destination end session index, the first source end load balancing index, and a first source end session index. The first source end session index is used to identify a session that is set up on the first node device, and the first node device exchanges a message with the second node device by using the session. In this way, after the first node device sends the first interaction message to the second node device at the peer end, the second node device may learn a session on the node device that exchanges a message with the second node device, and the second node device may use the first source end session index as a destination end session index in a subsequent interaction message when subsequently generating the interaction message with the first node device, to perform session persistence.

In a possible implementation, the second load balancing protocol header further includes a second destination end session index, and the processing, by the first node device, a service based on the second interaction message includes: processing, by the first node device, the service by using a session corresponding to the second destination end session index. In this way, when the second load balancing protocol header further includes the second destination end session index, a session between the first node device and the second node device may be kept on the session that is corresponding to the second destination end session index and that is on the first node device.

In a possible implementation, a second load balancer is not disposed at a front end of the first node device, and the method further includes: generating, by the first node device, a first initial interaction message, where the first initial interaction message includes a first initial load balancing protocol header, and content of the first initial load balancing protocol header is a default value; and then, sending, by the first node device, the first initial interaction message to the first load balancer at a front end of the second node device.

In another possible implementation, a second load balancer is disposed at a front end of the first node device, and the method further includes: generating, by the first node device, a second initial interaction message, where the second initial interaction message includes a second initial load balancing protocol header, and the second initial load balancing protocol header includes a second initial source end load balancing index and a second initial source end session index; and then, sending, by the first node device, the second initial interaction message to the first load balancer, where the first load balancer includes the second load balancer.

In this way, for a scenario in which a load balancer is not disposed at the front end of the first node device, and a scenario in which a load balancer is not disposed at the front end of the first node device, specific content of initial load balancing protocol headers in initial interaction messages generated by the first node device is different.

In a possible implementation, before the generating, by a first node device, the first interaction message, the method further includes: receiving, by the first node device, a third initial interaction message from the first load balancer, where the third initial interaction message includes a third initial load balancing protocol header, and content of the third initial load balancing protocol header is a default value, or the third initial load balancing protocol header includes a third initial source end load balancing index; and then, processing, by the first node device, the service based on the third initial interaction message. In this way, the first node device may process the service based on the third initial interaction message, and generate the first interaction message.

In a possible implementation, when the third initial load balancing protocol header includes the third initial source end load balancing index, the third initial load balancing protocol header further includes a third initial source end session index. The method further includes: determining, by the first node device, a third initial destination end session index. The processing, by the first node device, a service based on the third initial interaction message includes: processing, by the first node device, the service by using a session corresponding to the third initial destination end session index. After determining the third initial destination end session index, the first node device may keep the interaction message with the second node device on the session corresponding to the third initial destination end session index.

According to a second aspect, an embodiment of the present disclosure provides a session persistence method, including: first, receiving, by a load balancer, a first interaction message from a first device, where the first interaction message includes a first load balancing protocol header, the first load balancing protocol header is independent of a protocol header corresponding to a communications protocol layer at which the first interaction message is generated, and the first load balancing protocol header includes a first destination end load balancing index; and then, sending, by the load balancer, the first interaction message to a second device corresponding to the first destination end load balancing index.

In this way, when the load balancer receives the first interaction message from a first node device to a second node device, if different communications protocol layers are used between the first node device and the second node device that exchange a message, the load balancer may use a universal session persistence mechanism, to parse the first load balancing protocol header that is independently set in the first interaction message from the first node device, obtain the first destination end load balancing index in the first load balancing protocol header, and send the first interaction message to the second node device corresponding to the first destination end load balancing index, so as to keep a session on the second node device corresponding to the first destination end load balancing index, without a need to use different session persistence mechanisms for different communications protocol layers.

In a possible implementation, before the receiving, by a load balancer, a first interaction message from a first device, the method further includes: receiving, by the load balancer, an initial interaction message from the first device, where the initial interaction message includes an initial load balancing protocol header, and content of the initial load balancing protocol header is a default value, or the initial load balancing protocol header includes an initial source end load balancing index; then, determining, by the load balancer, an initial destination end load balancing index; and then, sending, by the load balancer, the initial interaction message to a second device corresponding to the initial destination end load balancing index.

In a possible implementation, when the initial load balancing protocol header includes the initial source end load balancing index, the initial load balancing protocol header further includes an initial source end session index. The determining, by the load balancer, an initial destination end load balancing index includes: determining, by the load balancer, the initial destination end load balancing index based on the initial source end load balancing index and the initial source end session index. In this way, when the initial load balancing protocol header includes the initial source end load balancing index and the initial source end session index, the load balancer may determine the initial destination end load balancing index based on the initial source end load balancing index and the initial source end session index, to send a plurality of session requests on a same source node device to different peer-end node devices. In this way, quantities of sessions on different peer-node devices are balanced, thereby implementing better load balancing.

According to still another aspect, an embodiment of the present disclosure provides a node device, including a processor and a transceiver, where the processor is configured to support the node device in performing a corresponding function in the foregoing methods. The transceiver is configured to support communication between the node device and another network element. The node device may further include a memory. The memory is coupled to the processor, and stores a program instruction and data that are necessary for the node device.

According to yet another aspect, an embodiment of the present disclosure provides a computer storage medium, configured to store a computer software instruction used by the foregoing node device. The computer storage medium includes a program designed for performing the foregoing aspects.

According to still another aspect, an embodiment of the present disclosure provides a load balancer, including a processor and a transceiver, where the processor is configured to support the load balancer in performing a corresponding function in the foregoing methods. The transceiver is configured to support communication between the load balancer and another network element. The load balancer may further include a memory. The memory is coupled to the processor, and stores a program instruction and data that are necessary for the load balancer.

According to yet another aspect, an embodiment of the present disclosure provides a computer storage medium, configured to store a computer software instruction used by the foregoing load balancer. The computer storage medium includes a program designed for performing the foregoing aspects.

According to yet another aspect, an embodiment of the present disclosure provides a communications system, including the node device and the load balancer described in the foregoing aspects.

With reference to any one of the foregoing aspects, in a possible implementation, a $k^{th}$ (k is a positive integer) initial interaction message and an $n^{th}$ (n is a positive integer) interaction message further include identification information of a load balancing protocol header. The identification information is used to identify the load balancing protocol header in the interaction message.

In a possible implementation, the identification information is information that identifies a protocol type of a load balancing protocol and that is in a protocol header of a lower-layer protocol adjacent to the load balancing protocol.

In a possible implementation, the identification information is a preset port number that is corresponding to a load balancing protocol and that is in a protocol header of a lower-layer protocol adjacent to the load balancing protocol.

In a possible implementation, the identification information is identity information that is of a flag bit corresponding to a load balancing protocol and that is in a protocol header of a lower-layer protocol of the load balancing protocol.

For ease of understanding, descriptions of some concepts related to the present disclosure are provided as an example for reference, as shown below. A load balancing index is used to identify a node device in a cluster system, and the node device may be specifically an entity network element or a VM in the cluster system. The load balancing index may be specifically an IP address, a MAC address, a virtual local area network (VLAN) identifier, or a value that is of a corresponding node device address and that is obtained by using a hash algorithm or the like.

A session index is used to identify a session on a node device.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
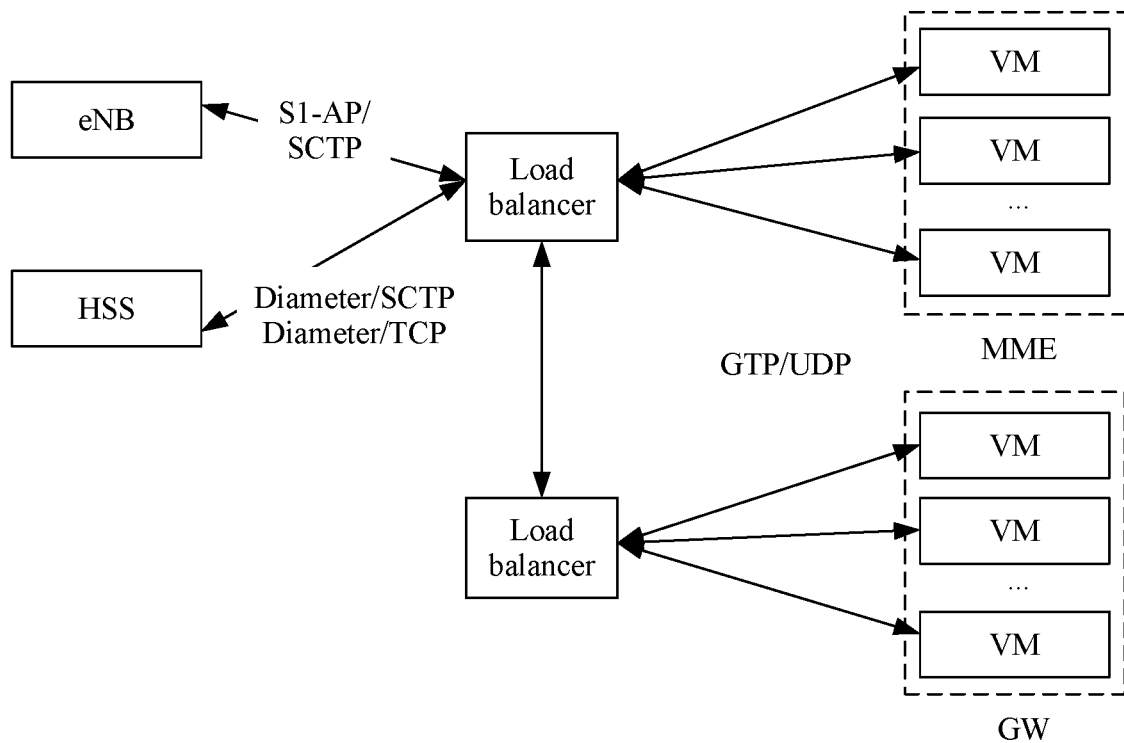
FIG. 1 is a diagram of an application example of a load balancing technology according to an embodiment of the present disclosure.
Figure 2A:
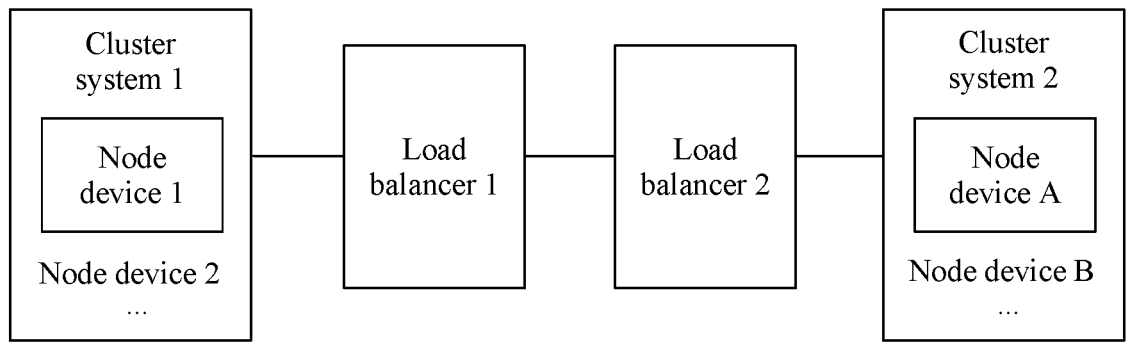
FIG. 2a is a schematic diagram of a system architecture according to an embodiment of the present disclosure.

A session persistence system architecture in the embodiments of the present disclosure may be shown in FIG. 2a. In FIG. 2a, the session persistence system may include a cluster system 1, a load balancer 1, a load balancer 2, and a cluster system 2. The cluster system 1 and the cluster system 2 each may specifically include a plurality of node devices, and each node device may be specifically an entity network element, or may be a VM. The load balancer 1 is disposed at a front end of the cluster system 1 and is configured to perform load balancing and session persistence on a request message sent to the cluster system 1. The load balancer 2 is disposed at a front end of the cluster system 2 and is configured to perform load balancing and session persistence on a request message sent to the cluster system 2. The load balancer 1 and the load balancer 2 may be specifically in a form of software or hardware, and may be an independently deployed physical device, or may be integrated into a switching device in a network. A node device in the cluster system 1 may exchange a message with a node device in the cluster system 2 by using the load balancer 1 and the load balancer 2.

Figure 2B:
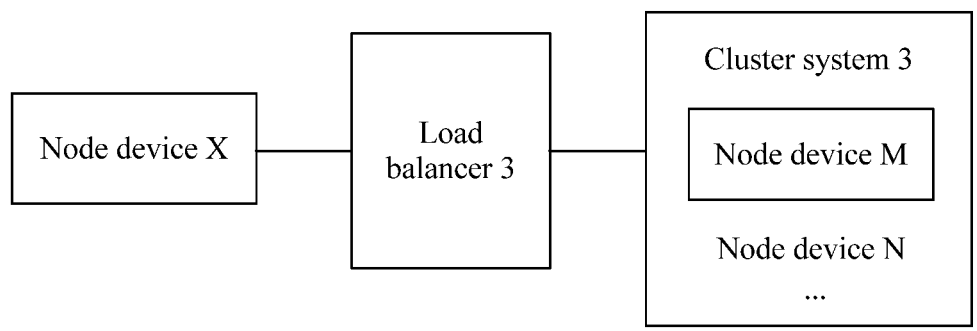
FIG. 2b is a schematic diagram of another system architecture according to an embodiment of the present disclosure.

Another session persistence system architecture in the embodiments of the present disclosure may be shown in FIG. 2b. In FIG. 2b, the session persistence system may include a node device X, a load balancer 3, and a cluster system 3. A load balancer is not disposed at a front end of the node device X. The cluster system 3 may specifically include a plurality of node devices. The load balancer 3 is disposed at a front end of the cluster system 3 and is configured to perform load balancing and session persistence on a request message sent to the cluster system 3. The load balancer 3 may be in a form of software or hardware, and may be an independently deployed physical device, or may be integrated into a switching device in a network. The node device X may exchange a message with a node device in the cluster system 3 by using the load balancer 3.

Figure 3:
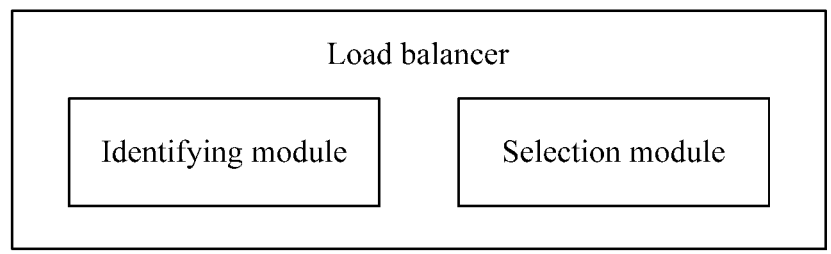
FIG. 3 is a schematic structural diagram of a load balancer according to an embodiment of the present disclosure.

FIG. 3 is a schematic structural diagram of a load balancer in the system architectures shown in FIG. 2a and FIG. 2b. The load balancer may include an identifying module and a selection module. The identifying module may be configured to identify a load balancing index, and the selection module may be configured to select, based on the identified load balancing index, a node device that the load balancer is to interact with.

In the foregoing system architectures shown in FIG. 2a and FIG. 2b, two node devices that exchange a message may separately be of different network element types, and different communication protocols are used between the node devices. Therefore, locations and specific forms of a load balancing index used for session persistence in a protocol stack are different, and therefore the load balancer needs to separately use different processing mechanisms to obtain the load balancing index, and implements session persistence based on the load balancing index. In this case, the embodiments of the present disclosure provide a universal session persistence mechanism. An independent load balancing protocol header corresponding to a load balancing protocol layer is set to transmit a load balancing index, to perform session persistence. In this way, the session persistence mechanism can be widely applied. Specifically, detailed descriptions are provided by using the following embodiments.

It should be noted that, in the following embodiments of the present disclosure, a "communications protocol" and a "communications protocol layer" have a same meaning, and can be mixed.

Figure 4:
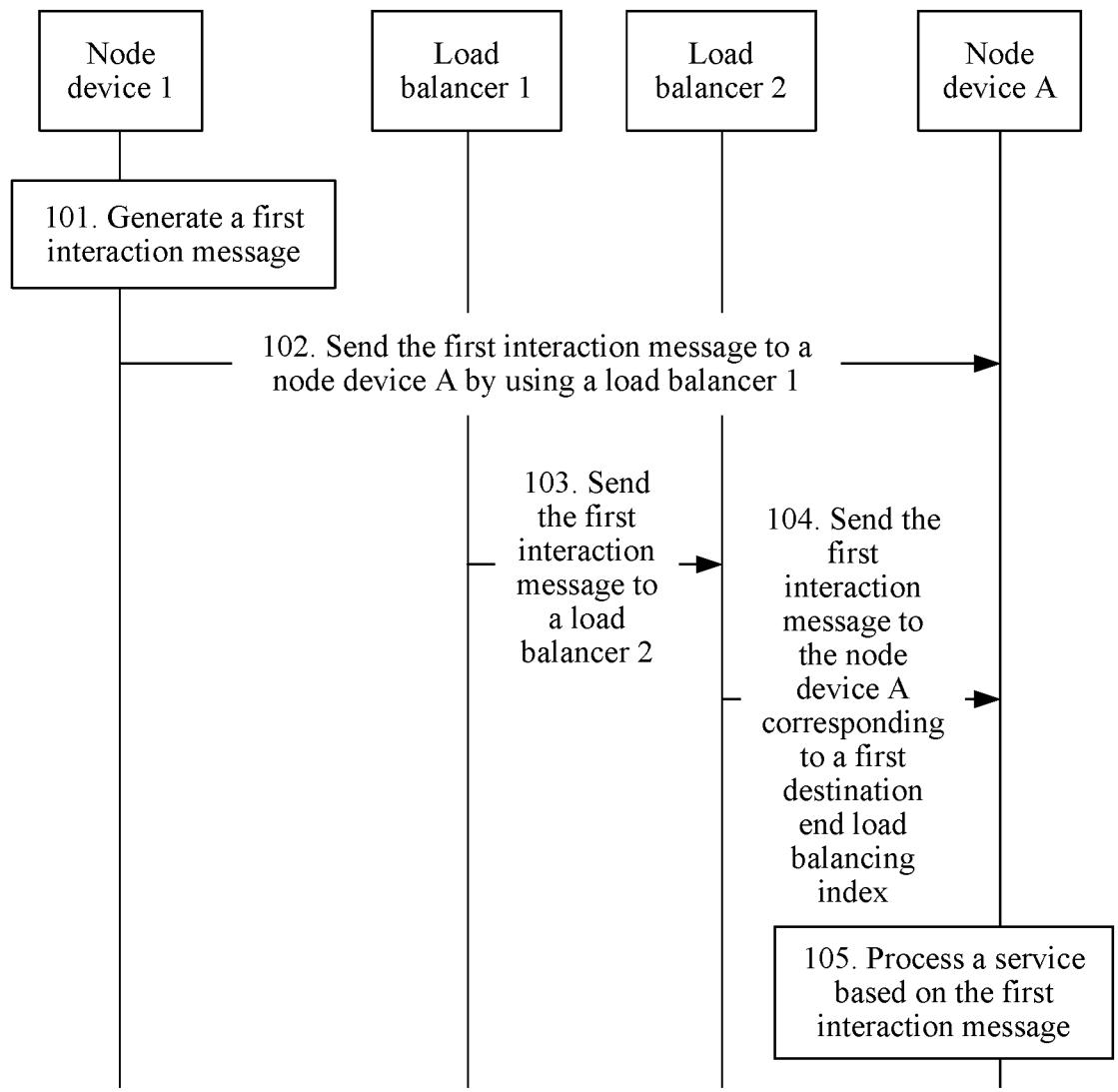
FIG. 4 is a flowchart of a session persistence method according to an embodiment of the present disclosure.

Based on the session persistence system architecture shown in FIG. 2a, an embodiment of the present disclosure provides a session persistence method, and message exchange between a node device 1 in a cluster system 1 and a node device A in a cluster system 2 is used as an example for description. Referring to FIG. 4, the method may include the following steps.

101. The node device 1 generates a first interaction message, where the first interaction message includes a first load balancing protocol header, the first load balancing protocol header is independent of a protocol header corresponding to a communications protocol layer at which the first interaction message is generated, the first load balancing protocol header includes a first destination end load balancing index, and the first destination end load balancing index is used to identify the node device A that is to receive the first interaction message.

The node device 1 in step 101 may correspond to the first node device in claim 1, and the node device A may correspond to the second node device in claim 1.

Specifically, a process of generating the first interaction message may relate to a plurality of communications protocol layers, and these communications protocol layers may form a protocol stack. For example, the plurality of communications protocol layers in the protocol stack may belong to four parts: an application layer, a transport layer, a network interconnection layer, and a network access layer. The application layer may include an S1AP protocol layer, a Diameter protocol layer, a GTP protocol layer, or the like. The transport layer may include an SCTP protocol layer, a TCP protocol layer, a UDP protocol layer, or the like. The communications protocol layer used by the node device 1 in the process of generating the first interaction message is specifically related to a type of a network element to which the node device 1 belongs and a type of a network element to which a peer-end node device belongs. In the process of generating the first interaction message by the node device 1, when a communications protocol layer is involved, the node device 1 may encapsulate, outside a previously generated message, a protocol header corresponding to the communications protocol layer. A format of the first interaction message finally generated by the node device 1 may be "[protocol header 1|protocol header 2| . . . |protocol m|application message content]". "m" is a positive integer, and may specifically represent a quantity of communications protocol layers in the process of generating the first interaction message, and the "application message content" is used to describe a specific interaction requirement.

In the prior art, because different communications protocol layers are used by different node devices for exchanging a message, a load balancing index used for session persistence may be located in protocol headers corresponding to the different communications protocol layers, and has different specific forms. Therefore, a load balancer needs to separately obtain the load balancing index by using different processing mechanisms to perform session persistence.

Figure 5A:
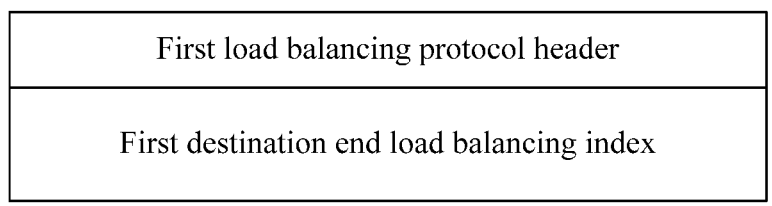
FIG. 5a is a schematic structural diagram of a first load balancing protocol header according to an embodiment of the present disclosure.

In this embodiment of the present disclosure, the first interaction message generated by the node device 1 includes the first load balancing protocol header that is independent of another communications protocol header, and the first load balancing protocol header includes the first destination end load balancing index. For specific content of the first load balancing protocol header, refer to FIG. 5a. A destination end load balancing index may be used to identify a peer-end node device that is to receive an interaction message from a current node device in a session persistence process, and the first destination end load balancing index is used to identify a node device that is to receive the first interaction message. In step 101, when the current node device is the node device 1, and the peer-end node device that exchanges a message with the node device 1 is the node device A in the cluster system 2, the first destination end load balancing index is a load balancing index corresponding to the node device A.

Figure 6:
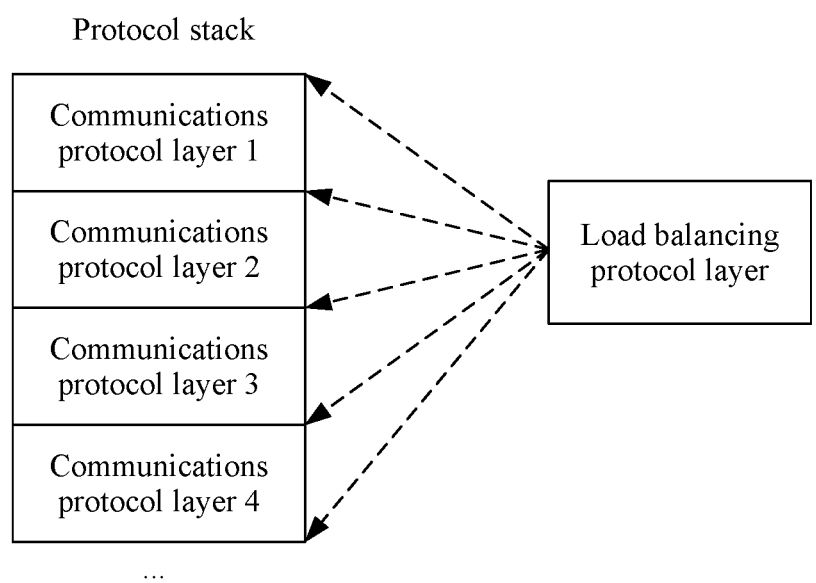
FIG. 6 is a schematic diagram of a location relationship between a load balancing protocol layer and another communications protocol layer according to an embodiment of the present disclosure.

It can be learned that, in the first interaction message generated by the node device 1, the first destination end load balancing index that is used to identify the peer-end node device that exchanges a message with the node device 1 is located in an independent protocol header that is specially set, instead of being hidden in protocol headers corresponding to different existing communications protocol layers. In addition, the first load balancing protocol header has a relatively flexible location in the first interaction message, and may be located outside a protocol header corresponding to any communications protocol layer, that is, a format of the first interaction message may be specifically "[protocol header 1|protocol header 2| . . . |first load balancing protocol header| . . . protocol header m|application message content]". To be specific, referring to FIG. 6, a load balancing protocol layer corresponding to the first load balancing protocol header may be flexibly inserted between different communications protocol layers in the protocol stack, so that the load balancing protocol layer can run above any different lower-layer communications protocol layers, and may support any different upper-layer communications protocol layers.

Back to FIG. 4, in step 102, the node device 1 sends the first interaction message to the node device A by using a load balancer 1.

The node device 1 in step 102 corresponds to the first node device in claim 1, the load balancer 1 corresponds to the first load balancer in claim 1, and the node device A corresponds to the second node device in claim 1.

After generating the first interaction message, the node device 1 may send the first interaction message by using the load balancer 1 at a front end of the cluster system 1 in which the node device 1 is located, and further send the first interaction message to the node device A corresponding to the first destination end load balancing index.

103. After receiving the first interaction message from the node device 1, the load balancer 1 sends the first interaction message to a load balancer 2.

After receiving the first interaction message from the node device 1, the load balancer 1 sends the first interaction message to the load balancer 2 at a front end of the cluster system 2 in which the node device A is located, to send the first interaction message to the node device A by using the load balancer 2.

104. After receiving the first interaction message from the load balancer 1, the load balancer 2 sends the first interaction message to the node device A corresponding to the first destination end load balancing index.

The load balancer 2 in step 104 corresponds to the load balancer in claim 10, the load balancer 1 corresponds to the first node device in claim 10, and the node device A corresponds to the second node device in claim 10.

The first interaction message includes the first load balancing protocol header, the first load balancing protocol header is independent of the protocol header corresponding to the communications protocol layer at which the first interaction message is generated, and the first load balancing protocol header includes the first destination end load balancing index. After receiving the first interaction message from the load balancer 1, the load balancer 2 may parse the first load balancing protocol header that is independently set in the first interaction message, obtain the first destination end load balancing index in the first load balancing protocol header, and send the first interaction message to the node device A that is corresponding to the first destination end load balancing index and that is in the cluster system 2 at a back end of the load balancer 2, to perform session persistence.

After the first interaction message from the node device 1 is received, the first load balancing protocol header is a protocol header that is independent of a protocol header corresponding to another communications protocol layer, and has a relatively flexible location in the first interaction message. The load balancing protocol layer corresponding to the first load balancing protocol header may be flexibly inserted between different communications protocol layers in the protocol stack, so that the load balancing protocol layer can run above any different lower-layer communications protocol layers, and may support different upper-layer communications protocol layers. Therefore, even if different communications protocol layers are used between node devices at both ends that exchange a message, the load balancer may parse the independently set first load balancing protocol header, and perform session persistence based on the first destination end load balancing index in the first load balancing protocol header, and does not need to use different specific processing mechanisms corresponding to different communications protocol layers to perform session persistence. In other words, based on an independently set load balancing protocol and the independently set first load balancing protocol header, the load balancer may use a universal session persistence mechanism for different communications protocol layers, to perform session persistence.

In addition, in the prior art, when a load balancing index is located in a protocol header corresponding to an upper-layer communications protocol layer, a load balancer further needs to parse protocol content of an upper-layer communications protocol layer to obtain the load balancing index, to perform session persistence. However, in the session persistence mechanism provided in this embodiment of the present disclosure, the load balancer only needs to parse the first load balancing protocol header to obtain the first destination end load balancing index, so as to perform session persistence, thereby reducing processing complexity and improving processing efficiency of the load balancer.

105. After receiving the first interaction message from the load balancer 2, the node device A processes a service based on the first interaction message.

After receiving the first interaction message from the load balancer 2, the node device A corresponding to the first destination end load balancing index may specifically process the service based on application message content in the first interaction message.

In the session persistence method provided in this embodiment of the present disclosure, by using the independently set load balancing protocol and the independently set load balancing protocol header, the load balancer may use the universal session persistence mechanism for different communications protocol layers, to perform session persistence.

Figure 7:
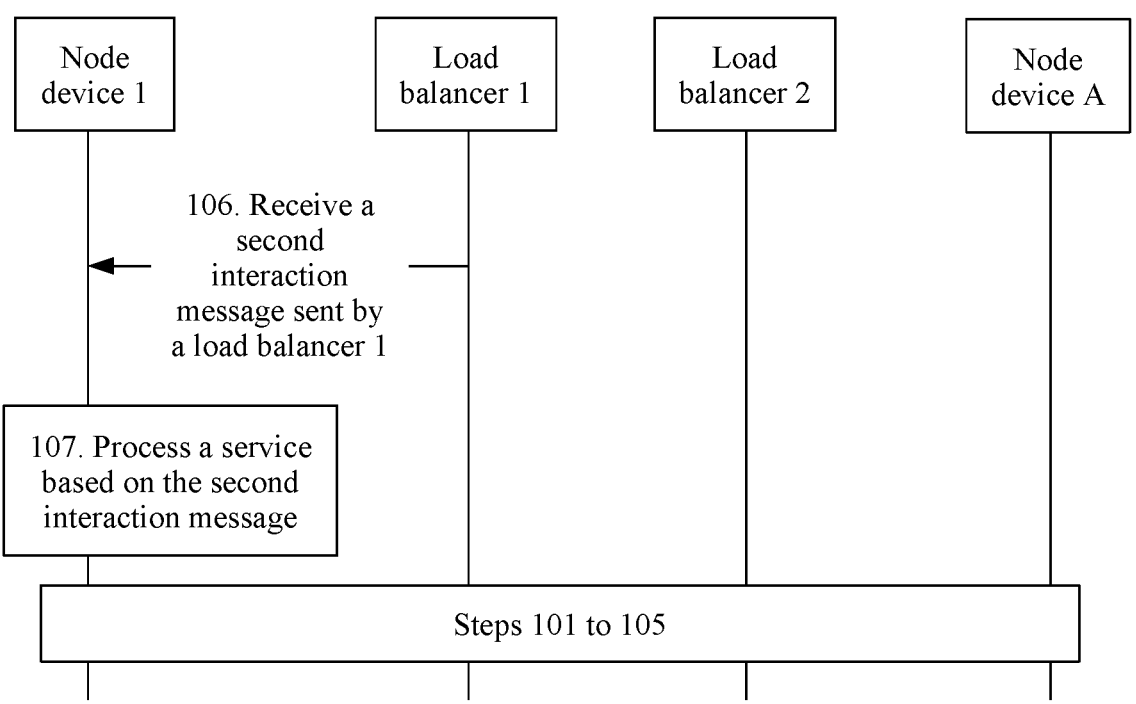
FIG. 7 is a flowchart of another session persistence method according to an embodiment of the present disclosure.

Before step 101, in a possible implementation, the node device A may further generate a second interaction message, and send the second interaction message to the node device 1 by using the load balancer 2 and the load balancer 1. As shown in FIG. 7, before step 101, the method provided in this embodiment of the present disclosure may further include the following steps.

106. The node device 1 receives a second interaction message from the load balancer 1, where the second interaction message includes a second load balancing protocol header, the second load balancing protocol header includes a second destination end load balancing index and a second source end load balancing index, and the node device 1 corresponds to the second destination end load balancing index.

In step 106, the node device 1 corresponds to the first node device in claim 2, and the load balancer 1 corresponds to the first load balancer in claim 2.

The second interaction message received by the node device 1 includes the second destination end load balancing index, and the second destination end load balancing index corresponds to the node device 1 that receives the second interaction message. In other words, the node device A sends the second interaction message to the node device 1 corresponding to the second destination end load balancing index, to perform session persistence.

In addition, the second interaction message may further include the second source end load balancing index, to indicate the peer-end node device A that sends the second interaction message, so that the node device 1 can learn a destination end node device that receives an interaction message from the node device 1 in a subsequent message exchange process. To be specific, the node device 1 may learn a destination end load balancing index in a load balancing protocol header when an interaction message is generated subsequently, and the destination end load balancing index is the same as the second source end load balancing index.

Based on step 106, that the node device 1 generates a first interaction message in step 101 may specifically include: The node device 1 generates the first interaction message based on the second source end load balancing index. The second source end load balancing index is the same as the first destination end load balancing index.

The node device 1 herein corresponds to the first node device in claim 2. Specifically, when generating the first interaction message, the node device 1 may use, as the first destination end load balancing index in the first interaction message, the second source end load balancing index in the second interaction message from the node device A.

107. The node device 1 processes a service based on the second interaction message.

In step 107, the node device 1 corresponds to the first node device in claim 2. The node device 1 corresponds to the second destination end load balancing index. After receiving the second interaction message, the node device 1 may specifically process the service based on application message content in the second interaction message, to keep a process of interacting with the node device A on the node device 1 corresponding to the second destination end load balancing index.

Figure 8:
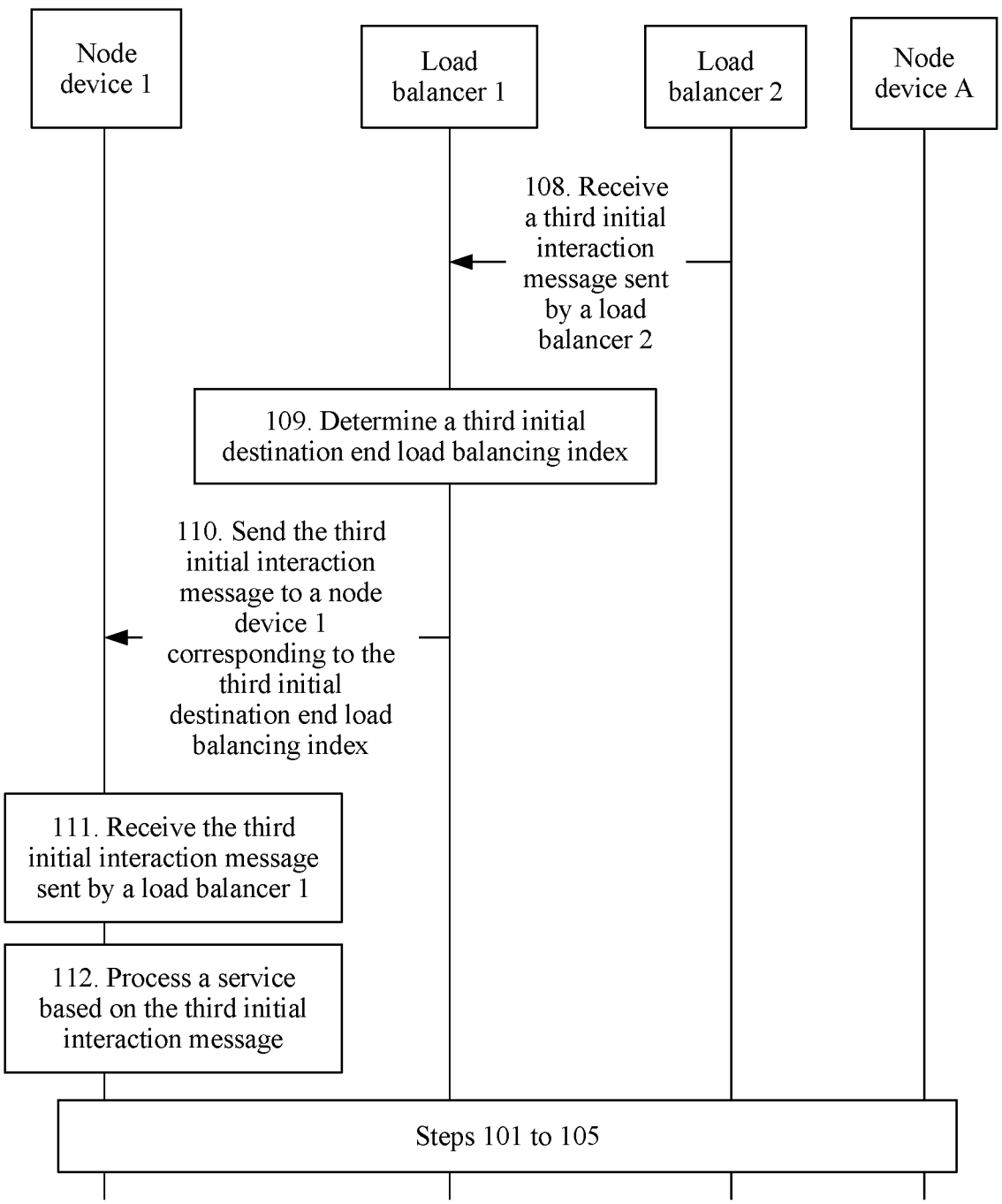
FIG. 8 is a flowchart of another session persistence method according to an embodiment of the present disclosure.

Before step 101, in another possible implementation, the node device A may further generate an initial interaction message, and send the initial interaction message to the node device 1 by using the load balancer 2 and the load balancer 1. As shown in FIG. 8, before step 101, the method provided in this embodiment of the present disclosure may further include the following steps.

108. The load balancer 1 receives a third initial interaction message from the load balancer 2, where the third initial interaction message includes a third initial load balancing protocol header, and content of the third initial load balancing protocol header is a default value, or the third initial load balancing protocol header includes a third initial source end load balancing index.

In step 108, the load balancer 1 corresponds to the load balancer in claim 12, the load balancer 2 corresponds to the first node device in claim 12, and the third initial interaction message corresponds to the initial interaction message in claim 12.

The third initial interaction message may be used to request to set up a session, and the third initial interaction message may include the third initial load balancing protocol header. Specific content of the third initial load balancing protocol header is different from specific content of the first load balancing protocol header, and the content of the third initial load balancing protocol header may be specifically a default value (for example, null), or the third initial load balancing protocol header may specifically include the third initial source end load balancing index.

Figure 9A:
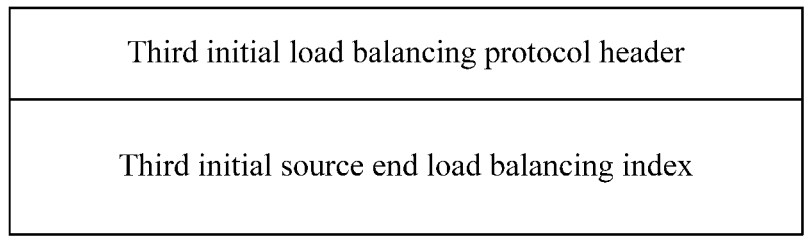
FIG. 9a is a schematic structural diagram of an initial load balancing protocol header according to an embodiment of the present disclosure.

Specifically, when a load balancer is not disposed at a front end of a node device that sends the third initial interaction message, the content of the third initial load balancing protocol header may be a default value (for example, null). When a load balancer is disposed at a front end of a node device that sends the third initial interaction message, the third initial load balancing protocol header may include the third initial source end load balancing index. In this embodiment of the present disclosure, because the load balancer 2 is disposed at the front end of the device node A that sends the third initial interaction message, the third initial load balancing protocol header may include the third initial source end load balancing index. For the specific content of the third initial load balancing protocol header, refer to FIG. 9a.

109. The load balancer 1 determines a third initial destination end load balancing index.

In step 109, the load balancer 1 corresponds to the load balancer in claim 12, and the third initial destination end load balancing index corresponds to the initial destination end load balancing index in claim 12.

After receiving the third initial interaction message from the load balancer 2, the load balancer 1 may determine the third initial destination end load balancing index. Specifically, the load balancer 1 may determine the third initial destination end load balancing index according to a load balancing rule in the prior art. When the third initial load balancing protocol header in the third initial interaction message includes the third initial source end load balancing index, the load balancer 1 may determine the third initial destination end load balancing index based on the third initial source end load balancing index. Generally, the load balancer 1 determines a same third initial destination end load balancing index for interaction messages from a same third initial source end load balancing index, to keep a session from the same third initial source end load balancing index on a node device corresponding to the same third initial destination end load balancing index.

110. The load balancer 1 sends the third initial interaction message to the node device 1 corresponding to the third initial destination end load balancing index.

In step 110, the load balancer 1 corresponds to the load balancer in claim 12, and the node device 1 corresponds to the second node device in claim 12.

The load balancer 1 sends the third initial interaction message to the node device 1 corresponding to the third initial destination end load balancing index, so that the node device A exchanges a message with the node device 1 corresponding to the third initial destination end load balancing index.

111. The node device 1 receives the third initial interaction message from the load balancer 1.

The third initial interaction message includes the third initial load balancing protocol header. For example, content of the third initial load balancing protocol header is a default value (for example, null), or the third initial load balancing protocol header includes the third initial source end load balancing index.

In step 111, the node device 1 corresponds to the first node device in claim 8, the load balancer 1 corresponds to the first load balancer in claim 8, and the third initial interaction message corresponds to the third initial interaction message in claim 8.

112. The node device 1 processes a service based on the third initial interaction message.

In step 112, the node device 1 corresponds to the first node device in claim 8. After receiving the third initial interaction message from the node device A by using the load balancer 2 and the load balancer 1, the node device 1 may process the service based on application message content in the third initial interaction message.

Figure 5B:
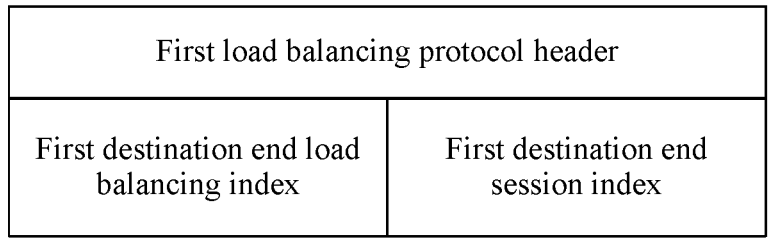
FIG. 5b is a schematic structural diagram of another first load balancing protocol header according to an embodiment of the present disclosure.
Figure 10:
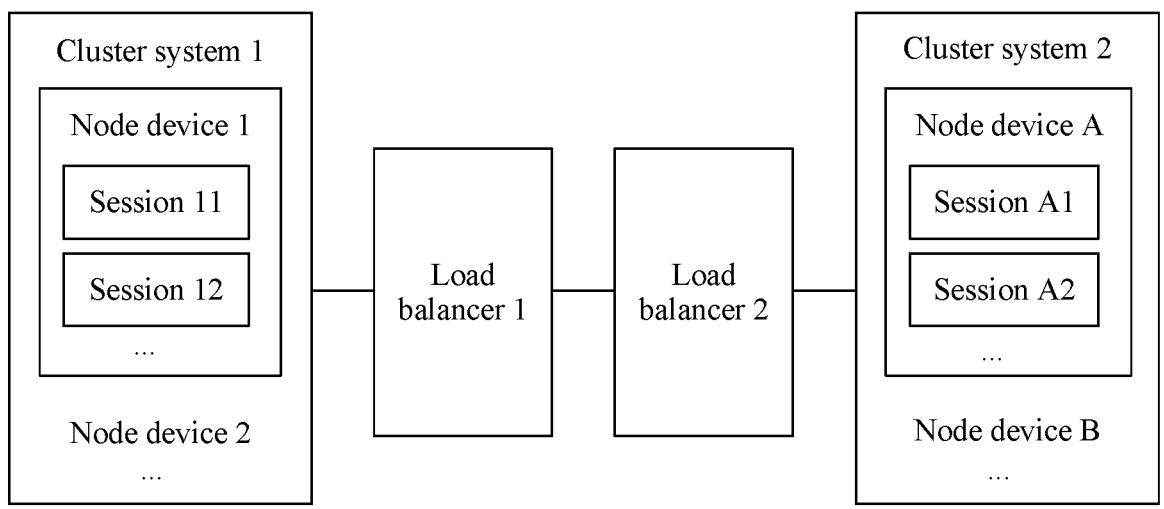
FIG. 10 is a schematic diagram of another system architecture according to an embodiment of the present disclosure.

Further, referring to FIG. 10, a plurality of sessions may be set up on each node device in the cluster system 1 and the cluster system 2 shown in FIG. 2a, and each session may correspond to one session index. Therefore, in this embodiment of the present disclosure, the second load balancing protocol header in step 106 may further include a second source end session index. Based on this, that the node device 1 generates a first interaction message specifically includes: The node device 1 generates the first interaction message based on the second source end load balancing index and the second source end session index. The first load balancing protocol header further includes a first destination end session index, and the second source end session index is the same as the first destination end session index. In this case, for specific content of the first load balancing protocol header, refer to FIG. 5b.

The first destination end session index is used to identify a first session, and the peer-end node device that receives the first interaction message exchanges, by using the first session, a message with the current node device that sends the first interaction message. The second source end session index is used to identify a second session. The current node device that sends the second interaction message exchanges a message with a peer-end node by using the second session. For example, in this embodiment of the present disclosure, the second source end session index may be specifically used to identify a session A1 that is used for exchanging a message with the node device 1 and that is on the node device A sending the second interaction message. The first destination end session index is used to identify the session A1 that is used for interacting a message with the node device 1 and that is on the node device A receiving the first interaction message. It can be learned that both the second source end session index and the first destination end session index are used to identify the session A1, and the second source end session index is the same as the first destination end session index. When receiving the second interaction message and learning the second source end session index, the node device 1 may use the second source end session index as the first destination end session index in the first interaction message.

Figure 5C:
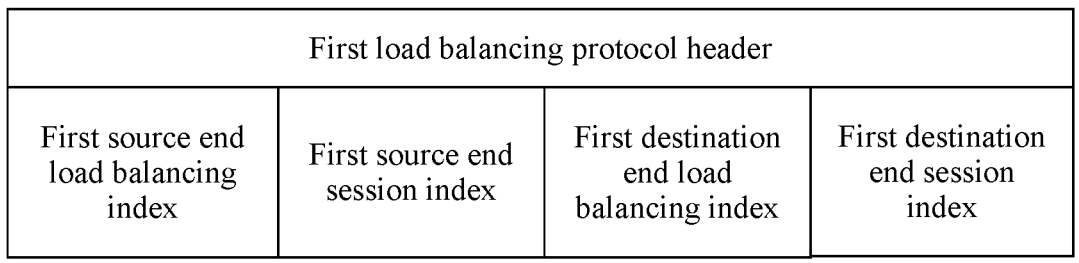
FIG. 5c is a schematic structural diagram of another first load balancing protocol header according to an embodiment of the present disclosure.

Further, the first load balancing protocol header may include a first source end load balancing index and a first source end session index. For specific content of the first load balancing protocol header, refer to FIG. 5*c*. The first source end load balancing index is used to identify the node device 1. The first source end session index is used to identify a session that is set up on the node device 1, and the node device 1 exchanges a message with the node device A by using the session. Further, the node device 1 may notify, by using the first interaction message, the peer-end node device of the current node device and an identifier that is on the current node device and that is corresponding to a session used for exchanging a message with the peer-end node device, so that the peer-end node device can learn the node device that exchanges a message with the peer-end node device and the session. In addition, when subsequently generating an interaction message with the current node device, the peer-end node device may use the first source end load balancing index and the first source end session index in the first interaction message as a destination end load balancing index and a destination end session index in the subsequently generated interaction message, to perform session persistence. As shown in FIG. 10, the first source end load balancing index may be specifically used to identify the node device 1 that sends the first interaction message, and the first source end session index may be specifically used to identify a session 11 that is on the node device 1 and that is used for exchanging a message with the peer-end node device.

Further, the second load balancing protocol header may include a second destination end session index. That the node device 1 processes a service based on the second interaction message in step 107 may include: The node device 1 processes the service by using a session corresponding to the second destination end session index.

The node device 1 herein corresponds to the first node device in claim 5. When the second interaction message further includes the second destination end session index, the node device 1 may process the service by using the session corresponding to the second destination end session index, to keep an interaction process on the session that is corresponding to the second destination end session index and that is on the node device 1.

Figure 9B:
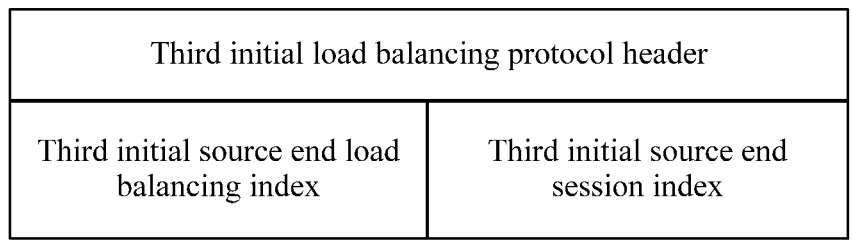
FIG. 9b is a schematic structural diagram of another initial load balancing protocol header according to an embodiment of the present disclosure.
Figure 11:
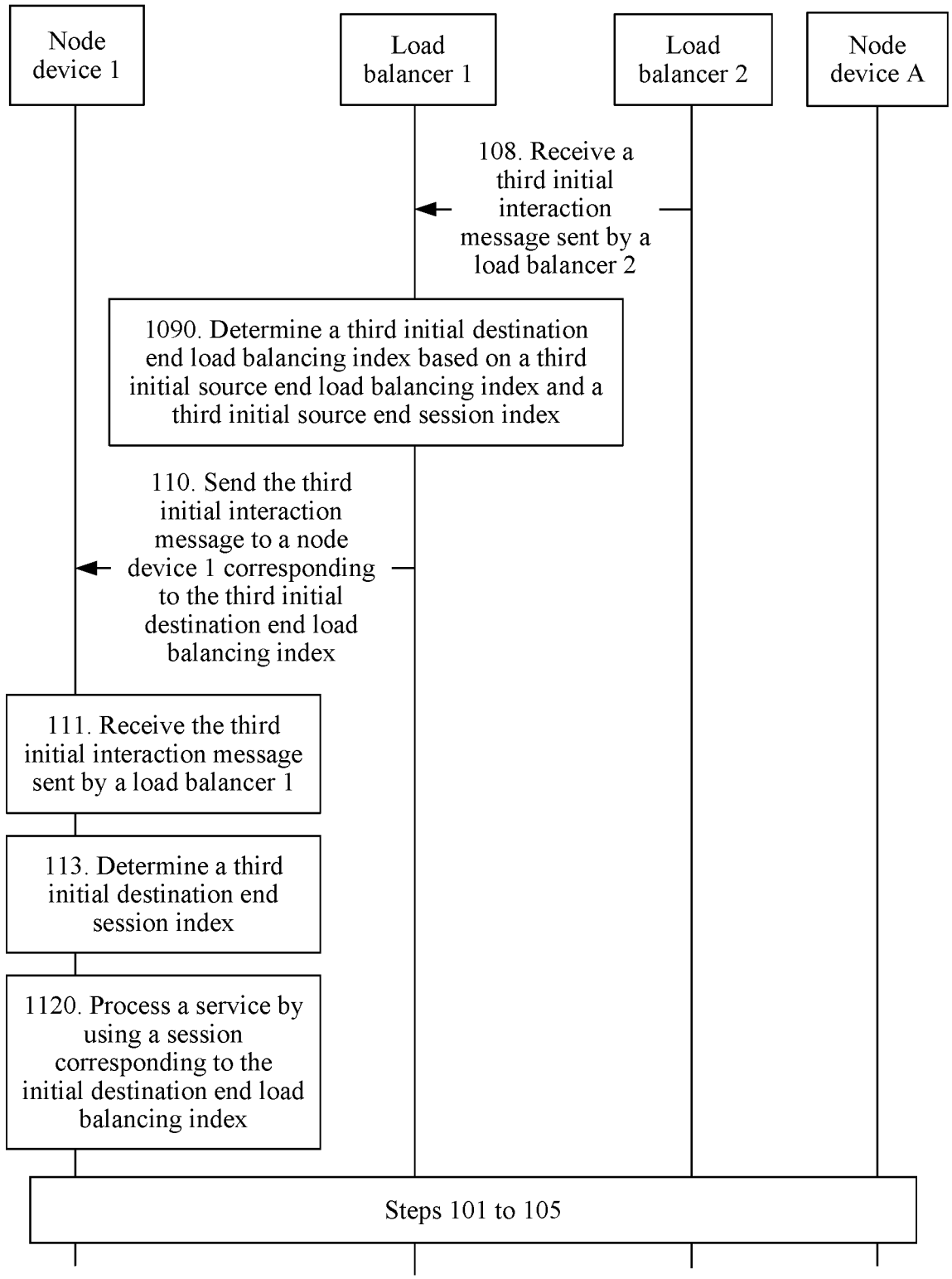
FIG. 11 is a flowchart of another session persistence method according to an embodiment of the present disclosure.

In addition, when the third initial load balancing protocol header in step 108 includes the third initial source end load balancing index, the third initial load balancing protocol header may further include a third initial source end session index. For specific content of the third initial load balancing protocol header, refer to FIG. 9*b*. In this case, as shown in FIG. 11, that the load balancer 1 determines a third initial destination end load balancing index in step 109 may include the following step.

1090. The load balancer 1 determines the third initial destination end load balancing index based on the third initial source end load balancing index and the third initial source end session index.

The load balancer 1 herein corresponds to the load balancer in claim 13, and the third initial source end session index corresponds to the initial source end session index in claim 13.

When the third initial load balancing protocol header further includes the third initial source end session index, the load balancer 1 may determine, based on the third initial source end load balancing index and the third initial source end session index, the third initial destination end load balancing index from the cluster system 1 to exchange a message by using a node device corresponding to the third initial destination end load balancing index, and keeps an interaction process on the node corresponding to the third initial destination end load balancing index in a subsequent communication process.

For example, in the cluster system 1, a plurality of users may be mounted on a first source node device, to correspond to a plurality of session requests. A small quantity of users may be mounted on another source node device, to correspond to a small quantity of session requests. According to the method in this embodiment of the present disclosure, the load balancer 1 may determine an initial destination end load balancing index based on an initial source end load balancing index and an initial source end session index, to determine different destination end load balancing indexes for sessions corresponding to different initial source end session indexes on a node device corresponding to the initial source end load balancing index when the initial source end load balancing index corresponds to a relatively large quantity of sessions, and further send a plurality of session requests on one source node device to different peer node devices, so as to balance quantities of sessions on different peer-end node devices, thereby achieving better load balancing.

Based on step 1090, referring to FIG. 11, the method provided in this embodiment of the present disclosure may further include the following step.

113. The node device 1 determines a third initial destination end session index.

In step 113, the node device 1 corresponds to the first node device in claim 9. Specifically, the node device 1 may determine a third initial destination end session index, to exchange a message with the node device A by using a session corresponding to the third initial destination end session index. The third initial destination end session index determined by the node device 1 may be specifically a session index corresponding to a session that is set up on the node device 1, or may be a session index corresponding to a session that is newly set up on the node device 1.

Based on step 113, that the node device 1 processes a service based on the third initial interaction message in step 112 may include the following step.

1120. The node device 1 processes the service by using a session corresponding to the third initial destination end session index.

In step 1120, the node device 1 corresponds to the first node device in claim 9. After determining an initial destination end session index, the node device 1 processes the service by using a session corresponding to the initial destination end session index, to keep an interaction process with the node device A in the session corresponding to the initial destination end session index.

Figure 12:
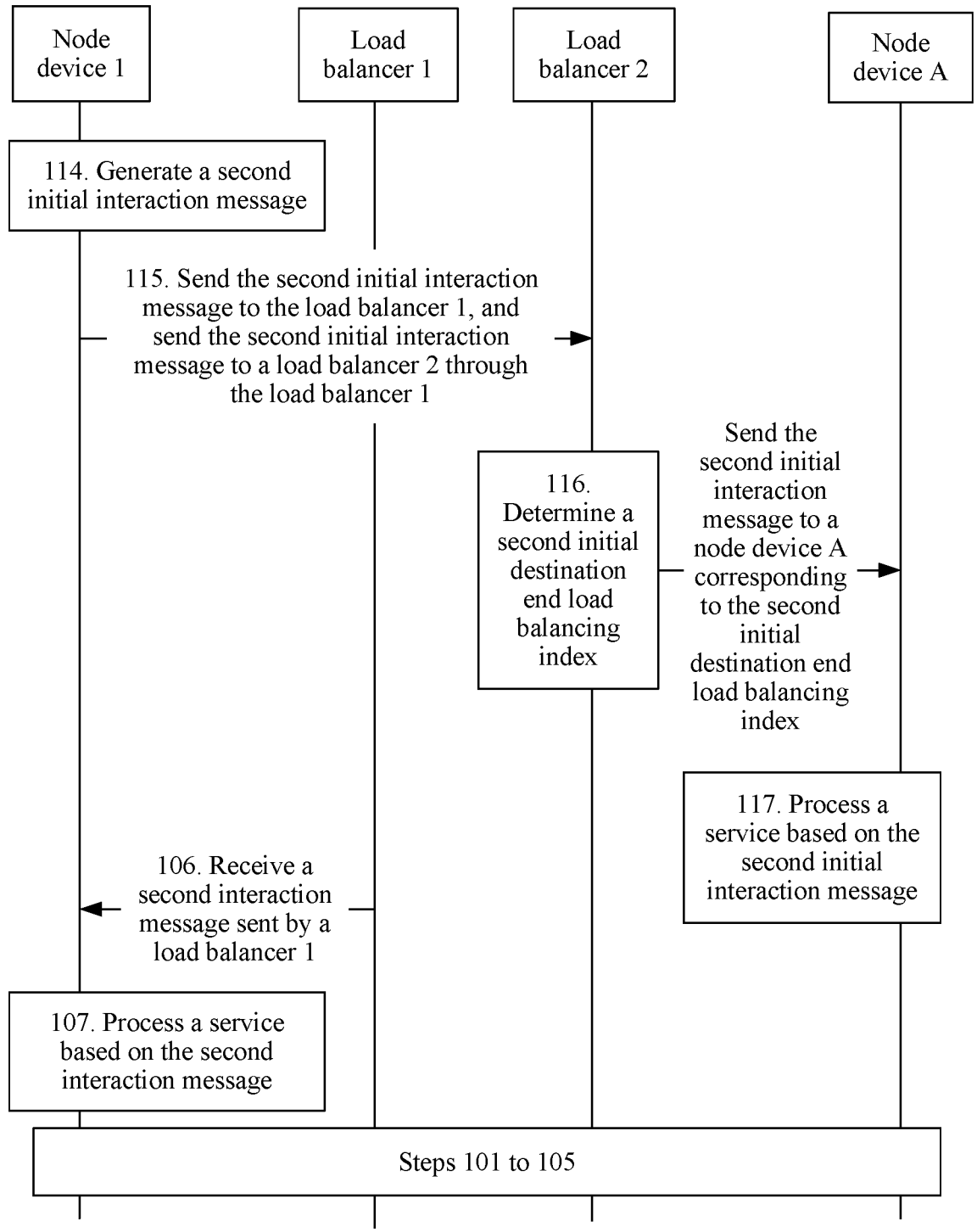
FIG. 12 is a flowchart of another session persistence method according to an embodiment of the present disclosure.

In addition, in this embodiment of the present disclosure, the load balancer 1 is disposed at the front end of the node device 1. Referring to FIG. 12, before step 106, the method provided in this embodiment of the present disclosure may further include the following steps.

114. The node device 1 generates a second initial interaction message, where the second initial interaction message includes a second initial load balancing protocol header, and the second initial load balancing protocol header includes a second initial source end load balancing index and a second initial source end session index.

In step 114, the node device 1 corresponds to the first node device in claim 7. Because a load balancer is disposed at the front end of the node device 1, the second initial load balancing protocol header generated by the node device 1 may include the second initial source end load balancing index and the second initial source end session index.

115. The node device 1 sends the second initial interaction message to the load balancer 1, and sends the second initial interaction message to the load balancer 2 by using the load balancer 1.

In step 115, the node device 1 corresponds to the first node device in claim 7, the load balancer 1 corresponds to the second load balancer in claim 7, and the load balancer 1 and the load balancer 2 correspond to the first load balancer in claim 7.

116. The load balancer 2 determines a second initial destination end load balancing index, and sends the second initial interaction message to the node device A corresponding to the second initial destination end load balancing index.

117. The node device A processes a service based on the second initial interaction message.

Specifically, in steps 116 and 117, the load balancer 2 may determine the second initial destination end load balancing index based on the second initial source end load balancing index and the second initial source end session index, and send the second initial interaction message to the node device corresponding to the second initial destination end load balancing index. The node device corresponding to the second initial destination end load balancing index further determines the second initial destination end session index, to keep an interaction process in a session corresponding to the second initial destination end session index. This process is similar to the process described in steps 1090, 110, 111, 113, and 1120. For details, refer to the foregoing related descriptions. Details are not described herein again.

It can be learned that, in the session persistence method provided in this embodiment of the present disclosure, during session setup, the load balancer may determine the initial destination end load balancing index based on the initial source end load balancing index and the initial source end session index, to send different session requests on a same source node device to different peer-end node devices. In this way, quantities of sessions on different peer-end node devices are balanced, thereby implementing better load balancing.

It should be noted that the interaction message in this embodiment of the present disclosure may include a $k^{th}$ (k is a positive integer) initial interaction message and an $n^{th}$ (n is a positive integer) interaction message, and the $n^{th}$ interaction message is exchanged after the $k^{th}$ initial interaction message is exchanged. For specific content of the $k^{th}$ initial interaction message, refer to FIG. 9a and FIG. 9b. Content of the $n^{th}$ interaction message is the same as content of the first interaction message. For details, refer to FIG. 5a, FIG. 5b, and FIG. 5c.

Further, in this embodiment of the present disclosure, the $k^{th}$ initial interaction message and the $n^{th}$ interaction message may further include identification information of a load balancing protocol header. The identification information is used to identify a load balancing protocol header in an interaction message. The identification information may be in a plurality of specific forms. For example, the identification information is information that identifies a protocol type of a load balancing protocol in a protocol header of a lower-layer protocol adjacent to the load balancing protocol; or the identification information is a preset port number corresponding to a load balancing protocol in a protocol header of a lower-layer protocol adjacent to the load balancing protocol; or the identification information is identity information of a flag bit corresponding to a load balancing protocol in a protocol header of a lower-layer protocol of the load balancing protocol.

The first interaction message is used as an example. When the first interaction message further includes identification information of the first load balancing protocol header, the load balancer 2 may identify the first load balancing protocol header in the first interaction message based on the identification information after receiving, by using the load balancer 1, the first interaction message from the node device 1, to obtain content of the first load balancing protocol header through parsing.

When the first interaction message further includes the first load balancing protocol header, the node device A may further identify the first load balancing protocol header in the first interaction message based on the identification information after receiving, by using the load balancer 1 and the load balancer 2, the first interaction message from the node device 1, to obtain content of the first load balancing protocol header through parsing.

It should be noted that, after obtaining the specific content in the first load balancing protocol header through parsing, the load balancer 2 may add the specific content in the first load balancing protocol header to a specific location (for example, a beginning or an end) of the first interaction message, and send the first interaction message to the node device A. The node device A may directly obtain the specific content in the first load balancing protocol header from the first interaction message from the load balancer 2, and does not need to identify and parse the first load balancing protocol header based on the identification information again.

Figure 13:
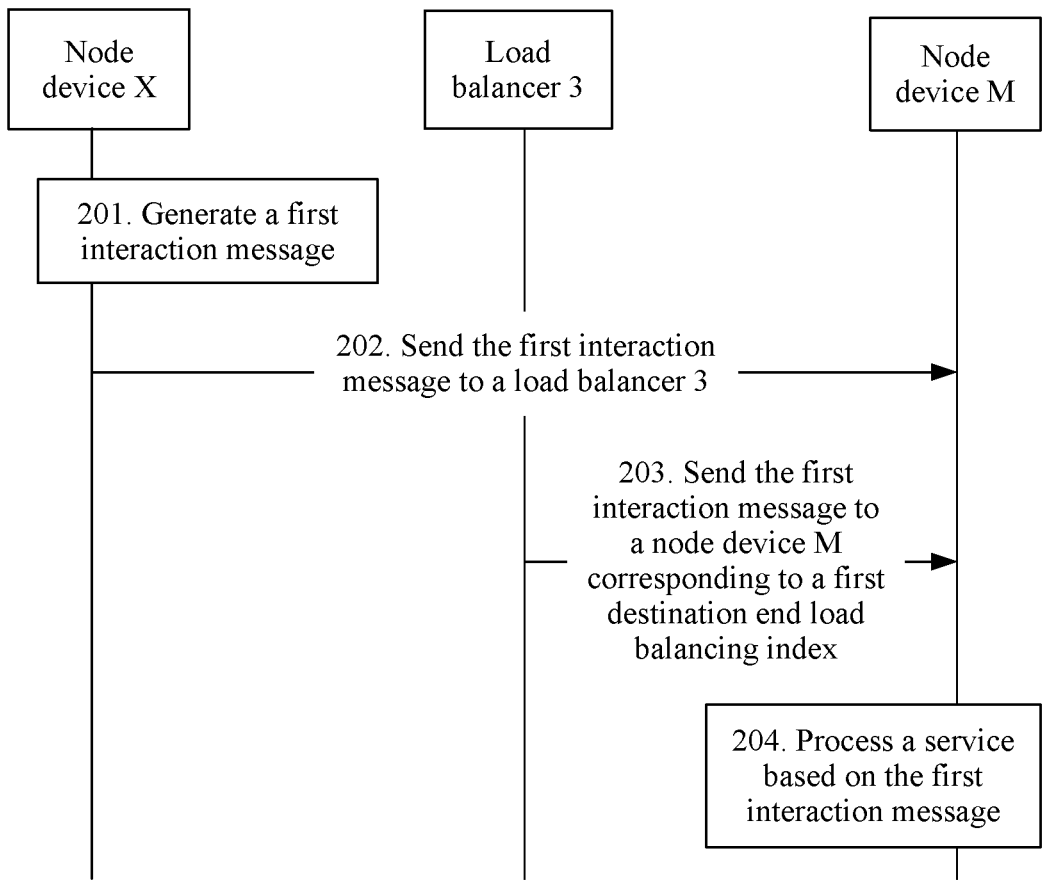
FIG. 13 is a flowchart of another session persistence method according to an embodiment of the present disclosure.

Based on the session persistence system architecture shown in FIG. 2b, another embodiment of the present disclosure provides a session persistence method. An example in which a node device X exchanges a message with a node device M in a cluster system 3 is used for description. Referring to FIG. 13, the method may include the following steps.

201. The node device X generates a first interaction message, where the first interaction message includes a first load balancing protocol header, the first load balancing protocol header is independent of a protocol header corresponding to a communications protocol layer at which the first interaction message is generated, the first load balancing protocol header includes a first destination end load balancing index, and the first destination end load balancing index is used to identify the node device M that is to receive the first interaction message.

The node device X in step 201 corresponds to the first node device in claim 1.

202. The node device X sends the first interaction message to the node device M by using a load balancer 3.

The node device X in step 202 corresponds to the first node device in claim 1, the load balancer 3 corresponds to the first load balancer in claim 1, and the node device M corresponds to the second node device in claim 1.

203. After receiving the first interaction message from the node device X, the load balancer 3 sends the first interaction message to the node device M corresponding to the first destination end load balancing index.

The load balancer 3 in step 203 corresponds to the load balancer in claim 10, the node device X corresponds to the first node device in claim 10, and the node device M corresponds to the second node device in claim 10.

204. After receiving the first interaction message from the load balancer 3, the node device M processes a service based on the first interaction message.

It should be noted that a process of implementing session persistence by using steps 201 to 204 in this embodiment of the present disclosure is similar to the process of implementing session persistence by using steps 101 to 105 in the foregoing embodiment corresponding to FIG. 2a. For details, refer to the descriptions of steps 101 to 105 in the foregoing embodiment corresponding to FIG. 2a. Details are not described herein again.

In addition, before step 201, the node device X may further receive a second interaction message from the node device M, or receive an initial interaction message from the node device M. Before receiving the second interaction message from the node device M, the node device X may further send the initial interaction message to the node device M. The interaction message in this embodiment of the present disclosure may also include a $k^{th}$ initial interaction message and an $n^{th}$ interaction message. The $k^{th}$ initial interaction message and the $n^{th}$ interaction message may further include identification information of a load balancing protocol header.

Figure 14A:
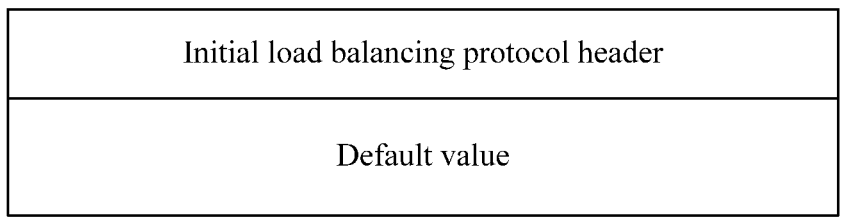
FIG. 14a is a schematic structural diagram of a $k^{th}$ initial load balancing protocol header according to an embodiment of the present disclosure.

Different from the foregoing embodiment corresponding to FIG. 2a, in this embodiment of the present disclosure, because a load balancer is not disposed at a front end of the node device X, before step 201, the $k^{th}$ initial interaction message generated by the node device X includes an initial load balancing protocol header, and content of the initial load balancing protocol header may be a default value (for example, null). For specific content of the initial load balancing protocol header, refer to FIG. 14a. The node device X herein may correspond to the first node device in claim 6, and the initial interaction message corresponds to the first initial interaction message in claim 6.

Figure 14B:
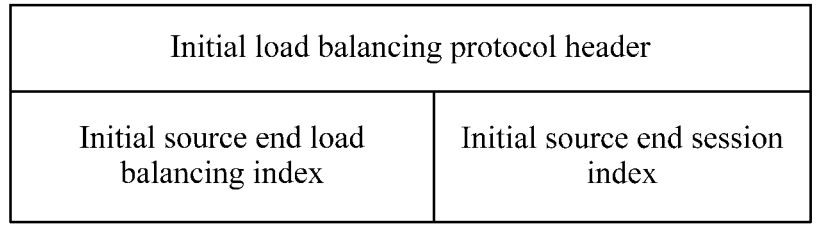
FIG. 14b is a schematic structural diagram of another $k^{th}$ initial load balancing protocol header according to an embodiment of the present disclosure.

In addition, in this embodiment of the present disclosure, a load balancer is disposed at a front end of the node device M. Therefore, before step 201, in the $k^{th}$ initial interaction message that is from the node device M and that is received by the node device X by using the load balancer 3, the content of the initial load balancing protocol header does not include a destination end load balancing index or a destination end session index, but may include an initial source end load balancing index and an initial source end session index. For specific content of the initial load balancing protocol header, refer to FIG. 14b.

Figure 15A:
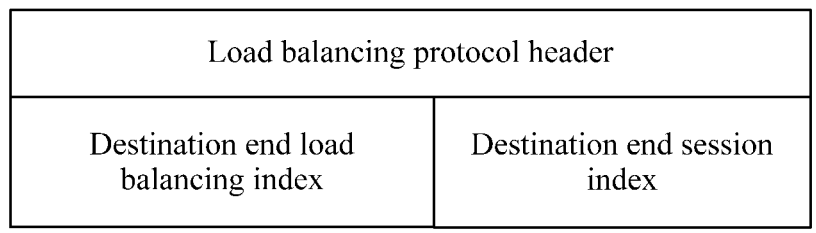
FIG. 15a is a schematic structural diagram of an $n^{th}$ load balancing protocol header according to an embodiment of the present disclosure.
Figure 15B:
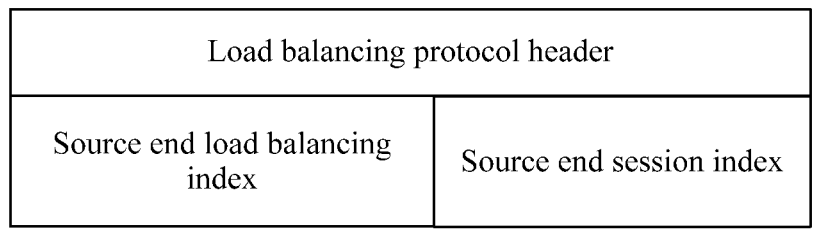
FIG. 15b is a schematic structural diagram of another $n^{th}$ load balancing protocol header according to an embodiment of the present disclosure.

Moreover, because a load balancer is not disposed at the front end of the node device X, and a load balancer is disposed at the front end of the node device M, in the load balancing protocol header of the $n^{th}$ interaction message from the node device X, a source end load balancing index and a source end session index are default values (for example, null), and the load balancing protocol header may include the destination end load balancing index and the destination end session index. For specific content of the load balancing protocol header, refer to FIG. 15a. In the load balancing protocol header of the $n^{th}$ interaction message from the node device M, the destination end load balancing index and the destination end session index are default values (for example, null), and the load balancing protocol header may include the source end load balancing index and the source end session index. For specific content of the load balancing protocol header, refer to FIG. 15b.

Figure 16:
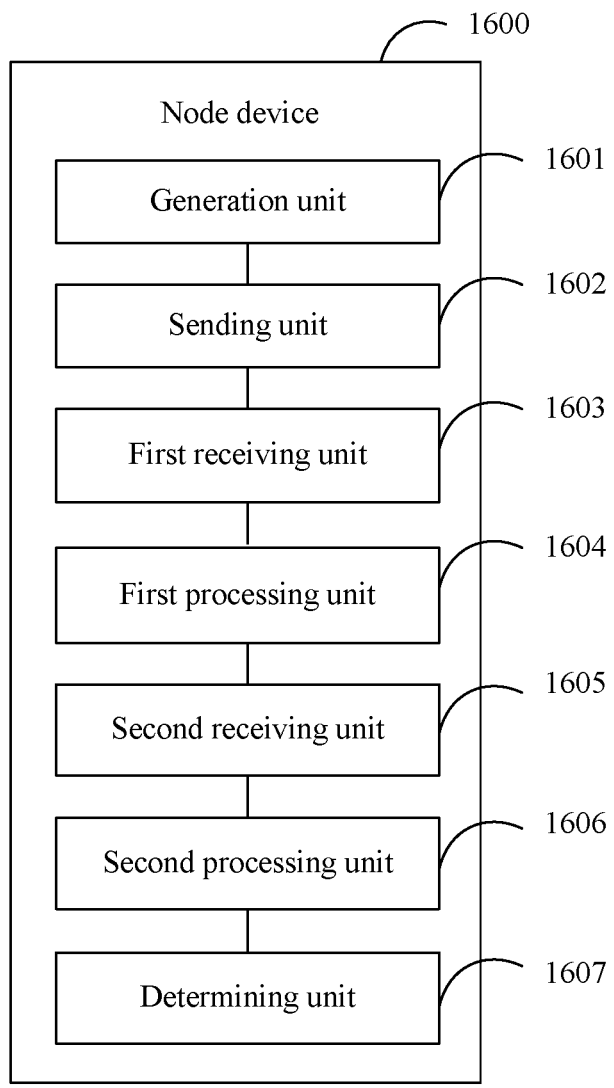
FIG. 16 is a schematic structural diagram of a node device according to an embodiment of the present disclosure.

An embodiment of the present disclosure further provides a node device 1600. As shown in FIG. 16, the node device 1600 may include: a generation unit 1601, a sending unit 1602, a first receiving unit 1603, a first processing unit 1604, a second receiving unit 1605, a second processing unit 1606, and a determining unit 1607. The generation unit 1601 may be configured to generate a first interaction message, where the first interaction message includes a first load balancing protocol header. The first load balancing protocol header is independent of a protocol header corresponding to a communications protocol layer at which the first interaction message is generated, the first load balancing protocol header includes a first destination end load balancing index, and the first destination end load balancing index is used to identify another node device that is to receive the first interaction message. The sending unit 1602 may be configured to send the first interaction message to the another node device via a first load balancer.

Further, the first receiving unit 1603 may be configured to perform step 106 in FIG. 7 and FIG. 12. The first processing unit 1604 may be configured to perform step 107 in FIG. 7 and FIG. 12. The second receiving unit 1605 may be configured to perform step 111 in FIG. 8 and FIG. 11. The second processing unit 1606 may be configured to perform step 112 in FIG. 8 and step 1120 in FIG. 11. The determining unit 1607 may be configured to perform step 113 in FIG. 11. The generation unit 1601 may be further configured to perform step 114 in FIG. 12. The sending unit 1602 may be further configured to perform step 115 in FIG. 12. In addition, the node device 1600 in FIG. 16 may be configured to execute any one of the foregoing method procedures, and details are not described herein in this embodiment of the present disclosure.

Further, the node device 1600 in FIG. 16 is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, persons skilled in the art may figure out that the node device 1600 in FIG. 16 may be in a form shown in FIG. 17. The units may be implemented by using a processor and a memory in FIG. 17.

Figure 17:
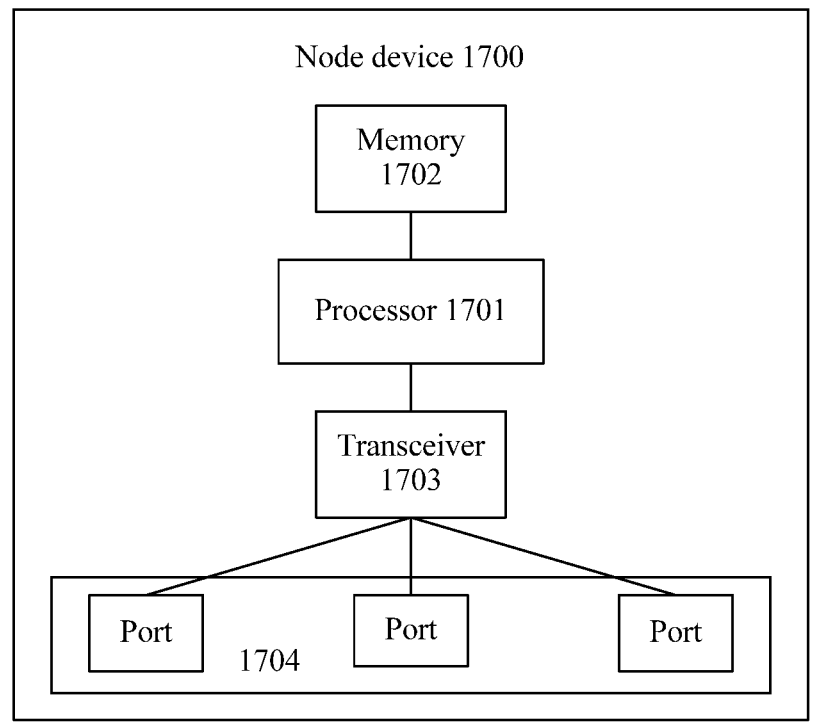
FIG. 17 is a schematic structural diagram of another node device according to an embodiment of the present disclosure.

As shown in FIG. 17, a node device 1700 may include one or more ports 1704 that are coupled to a transceiver 1703. The transceiver 1703 may be a transmitter, a receiver, or a combination thereof, and send or receive a data packet to or from another network node by using the port 1704. A processor 1701 is coupled to the transceiver 1703, and is configured to process a data packet. The processor 1701 may include one or more multi-core processors and/or a memory 1702. The processor 1701 may be a general-purpose processor, an application-specific integrated circuit, or a digital signal processor (DSP).

The memory 1702 may be a non-transitory storage medium, be coupled to the processor 1701, and be configured to store data of different types. The memory 1702 may include a read-only memory (ROM), a random access memory (RAM), or another type of dynamic storage device that may store information and an instruction, or may be a magnetic disk storage. The memory 1702 may be configured to store an instruction for implementing a session persistence related method. When the processor executes the instruction, the instruction enables the node device 1700 to perform related steps in FIG. 4, FIG. 7, FIG. 8, FIG. 11, FIG. 12, and FIG. 13. It may be understood that an executable instruction is programmed or loaded into at least one of the processor 1701, a cache, and a long-term memory of the node device 1700.

The node device 1700 may implement one or more instructions to trigger session persistence according to this embodiment of the present disclosure. These instructions may be stored in the memory 1702, or may be integrated into a kernel or a plug-in of the kernel in an operating system.

An embodiment of the present disclosure further provides a computer storage medium, configured to store computer software instructions used by the node device shown in FIG. 16 or FIG. 17. The computer storage medium includes a program designed for executing the foregoing method embodiments. Session persistence may be implemented by executing the stored program.

Figure 18:
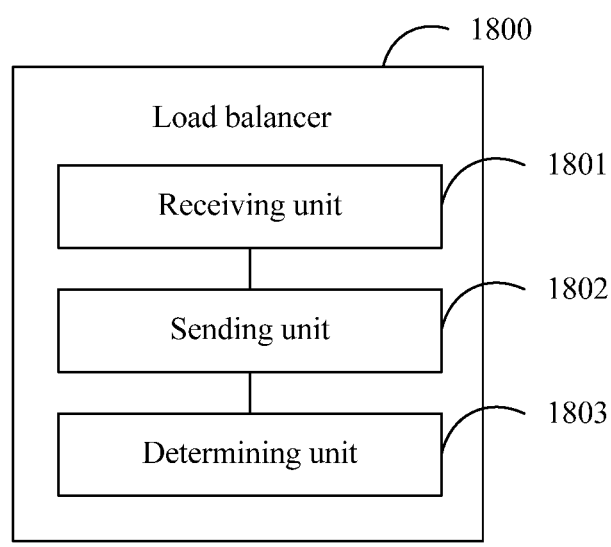
FIG. 18 is a schematic structural diagram of a load balancer according to an embodiment of the present disclosure.

An embodiment of the present disclosure further provides a load balancer 1800. As shown in FIG. 18, the load balancer 1800 may include a receiving unit 1801, a sending unit 1802, and a determining unit 1803. The receiving unit 1801 may be configured to receive a first interaction message from a first device, where the first interaction message includes a first load balancing protocol header. The first load balancing protocol header is independent of a protocol header corresponding to a communications protocol layer at which the first interaction message is generated, and the first load balancing protocol header includes a first destination end load balancing index. The sending unit 1802 may be configured to send the first interaction message to a second device corresponding to the first destination end load balancing index.

Further, the receiving unit 1801 may be further configured to perform step 108 in FIG. 8, and the determining unit 1803 may be configured to perform step 109 in FIG. 8 and step 1090 in FIG. 11, and the sending unit 1802 may be further configured to perform step 110 in FIG. 8. The determining unit 1803 and the sending unit 1802 may further perform step 116 in FIG. 12. In addition, the load balancer 1800 in FIG. 18 may be configured to execute any one of the foregoing method procedures, and details are not described herein in this embodiment of the present disclosure.

Further, the load balancer 1800 in FIG. 18 is presented in a form of a functional unit. The "unit" herein may be an application-specific integrated circuit ASIC, a circuit, a processor and a memory that execute one or more software or firmware programs, an integrated logic circuit, and/or another device that can provide the foregoing functions. In a simple embodiment, persons skilled in the art may figure out that the load balancer 1800 in FIG. 18 may be in a form shown in FIG. 19. The units may be implemented by using a processor and a memory in FIG. 19.

Figure 19:
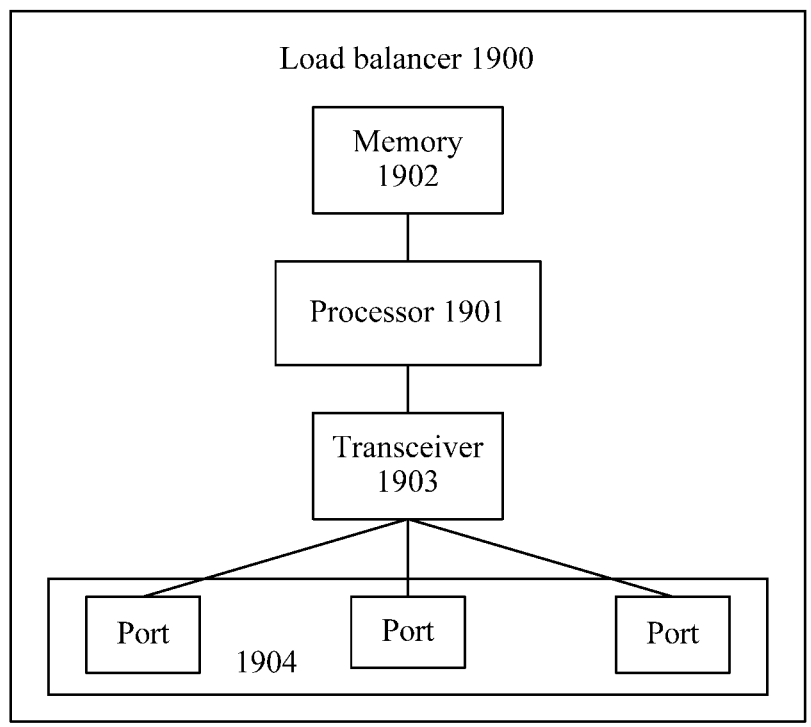
FIG. 19 is a schematic structural diagram of another load balancer according to an embodiment of the present disclosure.

As shown in FIG. 19, a load balancer 1900 may include one or more ports 1904 that are coupled to a transceiver 1903. The transceiver 1903 may be a transmitter, a receiver, or a combination thereof, and send or receive a data packet to or from another network node by using a port 1904. A processor 1901 is coupled to the transceiver 1903, and is configured to process a data packet. The processor 1901 may include one or more multi-core processors and/or a memory 1902. The processor 1901 may be a general-purpose processor, an application-specific integrated circuit, or a digital signal processor DSP.

The memory 1902 may be a non-transitory storage medium, be coupled to the processor 1901, and be configured to store data of different types. The memory 1902 may include a read-only memory ROM, a random access memory RAM, or another type of dynamic storage device that may store information and an instruction, or may be a magnetic disk storage. The memory 1902 may be configured to store an instruction for implementing a session persistence related method. When the processor executes the instruction, the instruction enables the load balancer 1900 to perform related steps in FIG. 4, FIG. 7, FIG. 8, FIG. 11, FIG. 12, and FIG. 13. It may be understood that an executable instruction is programmed or loaded into at least one of the processor 1901, a cache, and a long-term memory of the load balancer 1900.

The load balancer 1900 may implement one or more instructions to trigger session persistence according to this embodiment of the present disclosure. These instructions may be stored in the memory 1902, or may be integrated into a kernel or a plug-in of the kernel in an operating system.

An embodiment of the present disclosure further provides a computer storage medium, configured to store computer software instructions used by the load balancer shown in FIG. 18 or FIG. 19. The computer storage medium includes a program designed for executing the foregoing method embodiments. Session persistence may be implemented by executing the stored program.

An embodiment of the present disclosure further provides a communications system. For a basic architecture of the communications system, refer to FIG. 2a or FIG. 2b. The system includes the node device shown in FIG. 16 or FIG. 17 and the load balancer shown in FIG. 18 or FIG. 19. The node device and the load balancer may implement functions in the foregoing methods.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method of session persistence, comprising:
  generating, by a first node device, a first interaction message comprising a first load balancing protocol header independent of a protocol header corresponding to a communications protocol layer at which the first interaction message is generated, the first load balancing protocol header comprising a first destination end load balancing index used to identify a second node device to receive the first interaction message; and
  sending, by the first node device to the second node device via a first load balancer, the first interaction message,
  wherein before the generating the first interaction message:
  receiving, by the first node device from the first load balancer, a second interaction message comprising a second load balancing protocol header comprising a second destination end load balancing index and a second source end load balancing index, and the first node device corresponds to the second destination end load balancing index,
  wherein generating the first interaction message comprises:
  generating, by the first node device, the first interaction message based on the second source end load balancing index, wherein the second source end load balancing index is the same as the first destination end load balancing index; and processing, by the first node device, a service based on the second interaction message.

2. The method according to claim 1, wherein the second load balancing protocol header further comprises a second source end session index, and wherein generating the first interaction message comprises:

generating, by the first node device, the first interaction message based on the second source end load balancing index and the second source end session index, wherein the first load balancing protocol header further comprises a first destination end session index, and the second source end session index is the same as the first destination end session index.

3. The method according to claim 2, wherein the first load balancing protocol header further comprises a first source end load balancing index and a first source end session index, the first source end load balancing index is used to identify the first node device, the first source end session index is used to identify a session that is set up on the first node device, and the first node device exchanges a message with the second node device by using the session.

4. The method according to claim 1, wherein the second load balancing protocol header further comprises a second destination end session index, and wherein processing the service comprises:

processing, by the first node device, the service by using a session corresponding to the second destination end session index.

5. The method according to claim 1, further comprising:

generating, by the first node device, a first initial interaction message, wherein the first initial interaction message comprises a first initial load balancing protocol header, and content of the first initial load balancing protocol header is a default value; and sending, by the first node device, the first initial interaction message to the first load balancer at a front end of the second node device.

6. The method according to claim 1, wherein a second load balancer is included at a front end of the first node device, and the method further comprises:

generating, by the first node device, a second initial interaction message, wherein the second initial interaction message comprises a second initial load balancing protocol header, and the second initial load balancing protocol header comprises a second initial source end load balancing index and a second initial source end session index; and sending, by the first node device, the second initial interaction message to the first load balancer, wherein the first load balancer comprises the second load balancer.

7. The method according to claim 1, further comprising:

receiving, by the first node device, a third interaction message from the first load balancer, wherein the third interaction message comprises a third load balancing protocol header, and content of the third load balancing protocol header is a default value, or the third load balancing protocol header comprises a third source end load balancing index; and processing, by the first node device, the service based on the third interaction message.

8. The method according to claim 7, wherein when the third load balancing protocol header comprises the third source end load balancing index, the third load balancing protocol header further comprises a third source end session index; and the method further comprises:

determining, by the first node device, a third destination end session index; and wherein processing the service comprises:

processing, by the first node device, the service by using a session corresponding to the third destination end session index.

9. A node device, comprising:

a processor configured to generate a first interaction message comprising a first load balancing protocol header independent of a protocol header corresponding to a communications protocol layer at which the first interaction message is generated, the first load balancing protocol header comprising a first destination end load balancing index, and the first destination end load balancing index is used to identify another node device that is to receive the first interaction message;

a transmitter configured to send the first interaction message to the another node device via a first load balancer; and a receiver configured to: receive a second interaction message from the first load balancer, wherein the second interaction message comprises a second load balancing protocol header, the second load balancing protocol header comprises a second destination end load balancing index and a second source end load balancing index, and the node device corresponds to the second destination end load balancing index;

wherein the processor is configured to generate the first interaction message based on the second source end load balancing index, wherein the second source end load balancing index is the same as the first destination end load balancing index; and process a service based on the second interaction message.

10. The node device according to claim 9, wherein the second load balancing protocol header further comprises a second source end session index, and the processor is configured to generate the first interaction message based on the second source end load balancing index and the second source end session index, wherein the first load balancing protocol header further comprises a first destination end session index, and the second source end session index is the same as the first destination end session index.

11. The node device according to claim 10, wherein the first load balancing protocol header further comprises a first source end load balancing index and a first source end session index, the first source end load balancing index is used to identify the node device, the first source end session index is used to identify a session that is set up on the node device, and the node device exchanges a message with the another node device by using the session.

12. The node device according to claim 9, wherein the second load balancing protocol header further comprises a second destination end session index, and the processor is configured to process the service by using a session corresponding to the second destination end session index.

13. The node device according to claim 9, wherein the processor is further configured to generate a first initial interaction message, wherein the first initial interaction message comprises a first initial load balancing protocol header, and content of the first initial load balancing protocol header is a default value; and the transmitter is further configured to send the first initial interaction message to the first load balancer at a front end of the another node device.

14. The node device according to claim 9, wherein a second load balancer is included at a front end of the node device, and the processor is further configured to generate a second initial interaction message, wherein the second initial interaction message comprises a second initial load balancing protocol header, and the second initial load balancing protocol header comprises a second initial source end load balancing index and a second initial source end session index; and the transmitter is further configured to send the second initial interaction message to the first load balancer, wherein the first load balancer comprises the second load balancer.

15. The node device according to claim 9, further comprising:

a receiver, configured to: receive a third interaction message from the first load balancer, wherein the third interaction message comprises a third load balancing protocol header, and content of the third load balancing protocol header is a default value, or the third load balancing protocol header comprises a third source end load balancing index; and wherein the processor is configured to process the service based on the third interaction message.

16. The node device according to claim 15, wherein when the third load balancing protocol header comprises the third source end load balancing index, the third load balancing protocol header further comprises a third source end session index, and the processor is configured to determine a third destination end session index; and process the service by using a session corresponding to the third destination end session index.

17. A non-transitory computer-readable medium storing computer instructions for execution by one or more processors, wherein the computer instructions instruct the one or more processors to perform the operations of:

generating a first interaction message comprising a first load balancing protocol header independent of a protocol header corresponding to a communications protocol layer at which the first interaction message is generated, the first load balancing protocol header comprising a first destination end load balancing index used to identify a second node device that is to receive the first interaction message; and sending the first interaction message to the second node device via a first load balancer, wherein before the generating the first interaction message, the computer instructions further instruct the one or more processors to perform the operations of:

receiving from the first load balancer a second interaction message comprising a second load balancing protocol header comprising a second destination end load balancing index and a second source end load balancing index, and the one or more processors correspond to the second destination end load balancing index; and wherein generating the first interaction message comprises:

generating, the first interaction message based on the second source end load balancing index, wherein the second source end load balancing index is the same as the first destination end load balancing index; and processing a service based on the second interaction message.

* * * * *